INVENTOR
EDVARD MUNCH
BY [signature]
ATTORNEY

INVENTOR
EDVARD MUNCH
BY
ATTORNEY

INVENTOR
EDVARD MUNCH
BY
Harvey S. Lowhurst
ATTORNEY

United States Patent Office 3,495,175
Patented Feb. 10, 1970

3,495,175
AUTOMATIC CHANNEL SELECTION SYSTEM FOR A MULTICHANNEL COMMUNICATION SYSTEM

Edvard Munch, Fremont, Calif., assignor to Moore Associates, Inc., San Carlos, Calif., a corporation of California Filed July 19, 1967, Ser. No. 654,611
Int. Cl. H04b *1/36*
U.S. Cl. 325—65 28 Claims

ABSTRACT OF THE DISCLOSURE

Each channel of the multiple channel communication system includes a receiver which provides an output signal, generally in the form of an audio signal. Each receiver output signal is applied to an AGC amplifier means for leveling and, after having been leveled, to a common utilization means, such as a speaker, through controllable channel switches. The channel switches are controlled by a channel selection means which, prior to making a selection, maintains all channel switches open and, after making a selection, closes all channel switches except the switch of the selected channel.

BACKGROUND OF THE INVENTION

Field of the invention

This invention relates to multichannel communication systems and, more particularly, to such a communication system which automatically selects, and continually reselects, a channel on its merit of producing the largest signal above noise amplitude. More specifically, the invention addresses itself to means incorporated into the receiver portion of a communication system, of the type in which intelligence generated at a distant station is transmitted simultaneously along a plurality of transmission paths to the receiver portion, for automatically selecting and continually reselecting one of the plurality of transmission paths on the basis that it provides the best "quality" signal. The term "quality" is used throughout this application to designate a selected characteristic of the received signal, such as, for example, its signal to noise ratio or its signal above noise amplitude.

The present description is based on the definition of signal "quality" as being proportional to the signal above noise amplitude. The realization of this concept leads to excellent results with a minimum of complexity, and is closely related to signal "quality" expressed by its signal to noise ratio. The realization of the latter definition may be desirable for certain applications and will also be described.

Description of the prior art

An example of a multichannel communication system in which the transmission path selection system of this invention finds extensive application is a vehicular communication system in which a stationary dispatcher is in constant communication with the drivers of a fleet of cars.

The complexity of vehicular communication systems has much increased in the past years, causing many problems for the dispatchers. Some of the more serious problems affecting the efficiency, reliability and speed of communications are: the proper selection of transmitter, receiver and frequency at remote relay stations; the selection of the best incoming audio signal when multiple relay transmitters are signalling due to overlap or geography; and the difficulties encountered by the dispatcher at the receiving station when receiving overlapping or fading audio signals which cause dispatcher fatigue and which, oftentimes, result in misunderstandings between the dispatcher and the drivers.

The same difficulties are also encountered in air-to-ground, air-to-air, outer space-to-ground (or air) communication systems, whether transmitter and/or receiver are fixed or mobile. As long as multiple transmission paths are provided between an originator and the recipient of a message, one transmission path usually provides better reception than another transmission path. The same problems are also encountered with data transmission systems which transmit intelligence other than speech communication and which utilize multiple transmission paths. For example, telemetering data from satellites requires the strategic positioning of many antennas along the intended track of the satellite, giving rise to multiple path transmission. This is also true of the transmission of television programs and the like which utilize sub-stations. In the field of data transmissions and supervisory systems, multiple transmission paths are frequently used to assure reliable reception under all conditions.

Heretofore, the selection of the best transmission path was usually left to the operator who would, by trial and error, switch from one to the other to determine which path provided the best reception. Of course, when the operator found a transmission path which provided a relatively clear transmission, he would discontinue the selection process even though a much better channel might have been found if the process of selection had continued. Also, the operator would stay with a selected channel, despite its deterioration, until reception became unintelligible even though a much better channel became available soon after his initial selection.

An automatic channel selection system for continually selecting the best of a number of channels between a transmitter and receiver is described in my copending application, Ser. No. 486,650, filed on Sept. 13, 1965, now Patent No. 3,403,341 in which a unique periodic characteristic of the receiver output signal, other than the intelligence frequency, is constantly monitored and processed to provide a signal commensurate with its quality. The quality signals from all channels are continually compared with one another and with a selected reference signal, and the channel whose quality signal first exceeds the amplitude of a selected reference signal is utilized to select the channel giving rise to this particular quality signal.

The unique periodic characteristic being continually monitored, as fully explained in my copending application, is either a characteristic inherent in the transmitted intelligence, (other than the intelligence itself), or one which is added to it for selection purposes. The selection process is the same in either case. Ordinary voice communication has been found to have a suitable inherent periodic characteristic in the form of its speech "modulation" envelope which is eminently suitable for selection purposes. In the case of transmissions, other than ordinary voice communications, a suitable periodic characteristic is added for selection purposes.

While the automatic channel selection system described in my above-referenced copending application has been found highly satisfactory for the intended purpose and has proven to be infinitely superior to selecting a channel manually, it had a number of limitations which the present invention overcomes. For example, the individual channel receiver output signals entering into the selection decision process are subjected to the same constant amplification by the input amplifier of the receiver output signal processing means, and are then compared for selection. As a result thereof, a weak signal with an excellent signal over noise "quality" may be excluded (not selected) in favor of a strong signal with poor "quality." This is not always desirable since it is intended to select the best "quality" signal and not the one having the largest amplitude above the noise level.

Another shortcoming of the selection system described in my above-referenced system is that the amplitude range of the receiver output signals was limited by the constant gain and saturation characteristic of the input amplifier of the processing means so that time consuming gain adjustments would be required to adapt that system to accommodate significant changes in the amplitude of the receiver output signal. Finally, the previously described system is limited to a constant, manually adjustable reference level which does not take into account poor or continuously changing reception since it is set manually to what is regarded as a minimum acceptable satisfactory level.

It is therefore an object of this present invention to provide an improved channel selection system for a multichannel communication system which automtically selects and continually reselects the best communication channel.

It is a further object of this invention to provide a channel selection system which assures channel selection on the basis of the true "quality" of each receiver output signal in the presence of widely varying receiver input signal amplitudes and signal-to-noise ratios.

It is another object of the present invention to provide a selection system having a greatly extended range of acceptance signal amplitudes.

It is a still further object of the present invention to provide a selection system on the basis of a reference voltage level which at all times adapts its amplitude to the prevailing signal-over-noise "quality" of the receiver output signal to thereby insure useful selection in areas, or under circumstances, of poor or continuously changing reception.

It is still another object of the present invention to provide a channel selection system of the type described above which allows the time interval between selections. or the selection rate, to be adjusted over a range extending from less than a few milliseconds to more than several minutes.

It is still another object of the present invention to provide a selection system for a multichannel communication system which includes means for allowing the gain level of the processing means to adapt efficiently to changes in the receiver output signal amplitude, and which prevents overshoot of the processing amplifier output in response to input transients.

It is still another object of the present invention to provide an automatic selection system for a multichannel communication system which is responsive to the "quality" of the receiver output signal, and which is operative to remove that receiver output signal from the selection process by placing the amplifier of the processing means on standby status. In this manner, the utilization device is prevented from looking at a signal below a preselected "quality" with a maximum gain and thereby produce an output signal disturbing to the operator receiving the communication.

It is still another object of the present invention to provide an improved channel selection system for a multichannel communication system which includes means to assure against the highly improbable, but nevertheless possible, simultaneous selection of more than one channel.

It is still a further object of the present invention to provide a channel selection system which includes means for leveling the input to the utilization device to thereby avoid the considerable and undesirable amplitude variations between the condition existing prior to a selection and after a selection has been made, or because the conditions existing before and after a selection in case of reselection.

SUMMARY OF THE INVENTION

The automatic channel selection system of this invention, as applied to a multichannel voice communication system, has applied thereto receiver output signals from a plurality of channel receivers, each of which forms the terminating portion of one of the communication channels. The channel receive output signals comprise the audio signals having superimposed thereon the inherent speech envelopes which are characteristic of voice communication and, of course, the associated noise. While the channel receivers generally include automatic gain control, this AGC operates generally on the carrier and the channel receiver output signal amplitudes may differ widely depending on a carrier amplitude, stability and noise content.

Each channel receiver output signal is applied to a receiver output signal processing means which includes an automatic gain control upper threshold amplifier which provides a constant output level. The processing means also includes an automatic gain control lower threshold amplifier which senses when the receiver output signal is below a selected amplitude or "quality" level, and then switches the upper threshold amplifier to standby or idle gain and thereby greatly reduces the amplitude of the signal passed on to the selection circuits and utilization device. The leveled audio output signals from the upper threshold amplifiers of all processing means are applied, via individual and normally closed channel switches and a leveling amplifier, to a common utilization device which usually takes the form of a speaker.

The leveled audio output signals are also applied to speech envelope demodulators in each processing means which provide signals commensurate with the speech envelope as explained in my copending application, and which are commensurate with the sum of the audio signals and noise. These demodulated signals are utilized, after passing through a feedback network with appropriate gain versus time response, to provide one feedback signal to the upper threshold amplifier. The demodulated signals are also applied to integrators in the processing means which provide signals commensurate with the signal over noise and, therefore, integrated signals commensurate with the "quality" of the channel receiver output signals. These integrated signals may be utilized, after being shaped by feedback networks, as additional feedback signals to control the upper threshold amplifier.

The integrated (quality) signals from all processing means are compared, and the one having the largest amplitude is selected for further processing and becomes the preselection signal. The preselection signal is then compared with a floating reference voltage to determine whether its "quality" is acceptable and, if found acceptable, becomes the selection signal which opens all channel switches except the one of the selected channel.

There are further provisions for continually selecting the best channel, the frequency of selection or the selection rate being related to the expected time interval during which a particular channel will, in fact, remain the best channel.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawings in which:

BRIEF DESCRIPTION OF THE DRAWINGS

FIG. 5 is a schematic block diagram of the self-adaptive selection reference voltage circuit of FIG. 2.

DESCRIPTION OF THE PREFERRED EMBODIMENT

Figure 1:
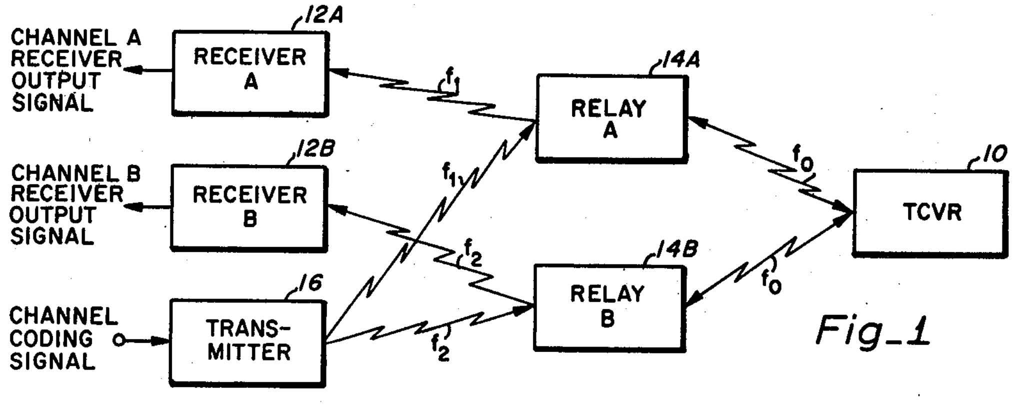
FIG. 1 is a schematic block diagram of a typical multichannel communication system with which the automatic channel selection system of this invention may be utilized.

Referring now to FIG. 1 of the drawings, there is shown a multichannel communication system which is exemplified by a distantly located transceiver means 10 which transmits and receives on a carrier frequency $f_0$, two receivers 12A and 12B which are respectively tuned to receive signals of carrier frequencies $f_1$ and $f_2$. The communication link (channel) between transceiver 10 and receiver 12A and transmitter 16 is formed by a relay station 14A which receives a signal of carrier frequency $f_0$ and retransmits the received signal on a carrier frequency $f_1$. Similarly, the communication link between transceiver 10 and receiver 12B is formed by a relay station 14B which receives a signal of carrier frequency $f_0$ and retransmits that signal on a carrier frequency $f_2$. The communication system so far described, even though illustrated as a dual channel system, is intended to be representative of a communication system having many more channels as is ordinarily the case. Each additional channel includes a further receiver and associated relay station which communicate on a further carrier frequency.

As will become better understood hereinafter, the channel selection system of this invention is useful not only for selecting the most intelligible transmission channel, but also for responding along the previously selected transmission channel, i.e., the channel which provided the most intelligible signal immediately preceding the response. Accordingly, there is further included in the communication system a transmitter 16 which may be keyed to provide a transmitted signal either on a carrier frequency $f_1$ or $f_2$, as illustrated, which is received by appropriate relay 14A or relay 14B for retransmitting to transceiver 10 on carrier frequency $f_0$. For a communicating system having more than two channels, transmitter 16 includes provisions for selectively transmitting to each additional relay station.

Channel receivers 12A and 12B are generally conventional RF receivers including an RF stage, an IF stage and one or more audio stages, and provide channel receiver output signals. Automatic gain control, if present, operates on the carrier and receiver output signals and may differ widely depending on carrier amplitude, stability and noise content.

Figure 2:
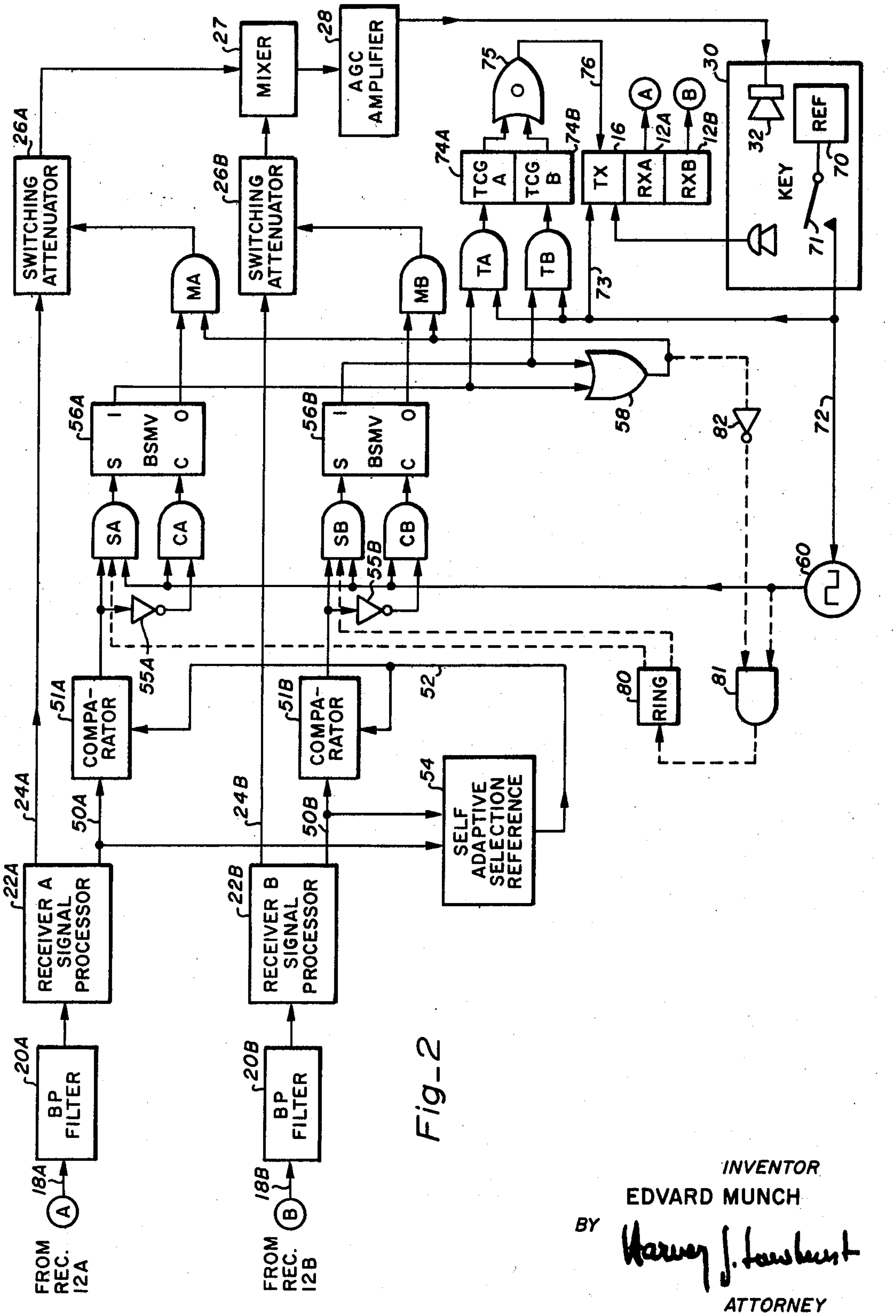
FIG. 2 is a schematic block diagram of the channel selection system of the present invention together with the utilization device and an assurance system which is shown in dotted outline.

Referring now particularly to FIG. 2, there is shown a schematic block diagram of the channel selection system of this invention operatively connecting receivers 12A and 12B and transmitter 16.

The output signal from receiver 12A is applied, via lead 18A and a suitable bandpass filter 20A which typically has a bandpass from 200 to 2000 Hz., to a receiver output signal processing means 22A which forms the input portion of A channel of the channel selector means of this invention. Similarly, the output signal from receiver 12B is applied, via lead 18B and bandpass filter 20B, to a receiver output signal processing means 22B which forms the input portion of the B channel of the channel selection means. For additional channels, additional processing means 22 are provided.

The channel selection means may broadly be subdivided into: individual receiver output signal processing means, there being one for each channel, for providing individual channel output signals and individual channel quality signals; a common quality signal comparing means for comparing the quality signals and for providing a selection signal; and a channel selection means responsive to the selection signal and operative, under certain conditions, to select the channel.

Figure 3:
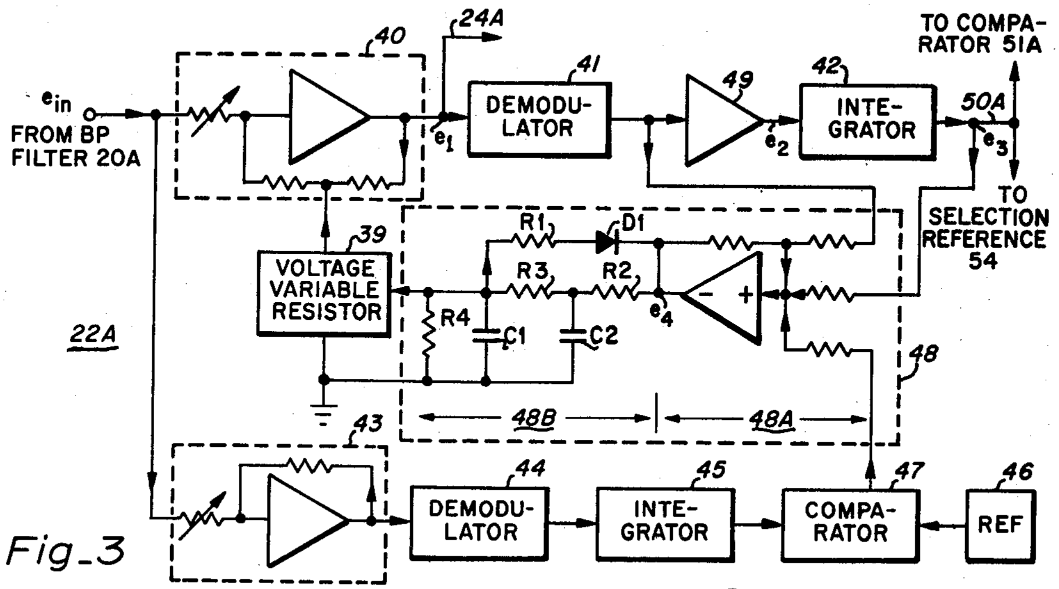

As will be more fully explained in connection with the description of FIG. 3, processing means 22A and 22B include automatic gain control means for leveling the channel receiver output signals applied thereto and to develop the leveled (channel) output signals. In this manner, the processing means assure that the amplitude of all receiver output signals, comprising the sum of the audio signal and the noise, are the same. Processing means 22A and 22B also develop the channel quality signals which are applied, via leads 50A and 50B, to the quality signal selection means comprising self-adaptive selection reference voltage means 54 and comparators 51A and 51B. The leveled output signals are respectively applied, via individual leads 24A and 24B, and individual controllable channel switches or attenuators 26A and 26B, to a common mixer 27 and a common AGC amplifier 28. The output of AGC amplifier 28 is connected to a utilization device 30 and, more particularly to speaker 32. Controllable channel switches or attenuators 26A and 26B are normally open so that, in the absence of a selection, all leveled output signals are simultaneously applied through mixer 27 to amplifier 28. The primary purpose of AGC amplifier 28 is to assure that the signal amplitude applied to the utilization means remains substantially constant and independent of whether all channels are applied or only a selected channel is applied.

Receiver output signal processing means

Since output signal processing means 22A and 22B are substantially identical, only one will be described herein in detail, it being understood that such description is applicable to each such processing means. Processing means 22A, as shown in FIG. 3, includes an upper threshold gain controlled amplifier 40 in series with a speech envelope demodulator 41, an amplifier 49, a speech envelope integrator 42, a lower threshold amplifier 43 in parallel with amplifier 40 and in series with a speech envelope demodulator 44, and a speech envelope integrator 45. Further, there is provided a reference voltage source 46 and a comparator 47 which compares the output signal from integrator 45 with the reference voltage from source 46 and which provides a constant output signal, also referred to as the suppression signal, when the integrated signal from integrator 45 is less than the reference voltage from source 46. Finally, gain control for AGC amplifier 40 is provided by a negative feedback network 48 which comprises a summing amplifier 48A receiving input signals from demodulator 41, integrator 42, comparator 47 and an RC time constant network 48B connected to the output of amplifier 48A, and having its output lead connected to the gain control input terminal of AGC amplifier 40 through a voltage variable resistor network 39.

(*a*) *Upper threshold AGC amplifier channel.*—Amplifier 40 is a gain controllable audio amplifier connected to provide a substantially constant output amplitude in response to a selected range of input signal amplitudes. Demodulators 41 and 44 are speech envelope demodulators which provide demodulated signals commensurate with the speech envelope plus noise of the leveled signal, as is fully described in my above-referenced copending application. Briefly, speech envelope demodulators 41 and 44 have rise time constants which are typically one-third of the normal speech impulse duration and fall time constants which is typically one-third of the normal speech pause duration so that the demodulated output signal, after having risen to a maximum during the speech impulse period, may decay to the noise level before the end of the immediately following speech pause interval. Typically, the rise and fall time constants are each about one-twelfth of a second. The demodulated signal from demodulator 41 is the primary feedback signal which is applied, via summing amplifier 48A and RC time constant network 48B, to the gain control terminal of amplifier 40 to level the amplitude of the receiver output signal when the same is above a selected minimum amplitude.

The change in gain of amplifier 40 with time and in response to input amplitude variations, henceforth called "time response" of the receiver output signal, is important as will hereinafter be explained, and is obtained with the aid of RC time constants built into network 48B of the feedback loop of amplifier 40 and by utilizing the integrated signal from integrator 42 as an additional feedback signal.

Four aspects of the "time response" of the feedback network of amplifier 40 will now be defined. The Ordinary Fall time is the time required for the gain of amplifier 40 to decrease and stabilize at a lower gain level in response to a relatively slow increase of signal input amplitude. The Sudden Fall time is the time required for the gain of amplifier 40 to respond to a sudden increase of input signal amplitude and to decrease to a level that will prevent an overshoot or increase of the amplitude of the leveled output signal. The Ordinary Rise time is the time required for the gain of amplifier 40 to increase and stabilize at a higher gain level in response to a decrease or removal of input signal. And the Gain Stability describes the ability of amplifier gain to find its new level with a minimum of overshoot and oscillations, in response to an abrupt change of input signal amplitude.

Briefly, the RC network 48B comprises a pair of resistors R2 and R3 which are serially connected between summing amplifier 48A and network 39, a pair of capacitors C2 and C1 which are respectively connected in shunt with resistors R2 and R3, a resistor R4 which is connected in parallel with capacitor C1, and a feedback path in parallel with resistors R2 and R3 which comprises the serial combination of a resistor R1 and a diode D1. This network provides essentially two time constants, namely, one relatively long (3 to 5 seconds) and associated with Ordinary Fall and Ordinary Rise times, and the other relatively short (0.1 to 0.5 second) and associated with Sudden Fall time.

Assuming the capacitance value of C2 to be ten times that of C1 and the resistance value of R2 to equal that of R1, it is immediately seen that $R2C2=10\ R1C1$, so that R2C2 is essentially the longer time constant and that R1C1 is essentially the shorter time constant. The significance of these time constants will now be explained.

The Ordinary Fall time should ideally allow the gain of amplifier 40 to adjust immediately to an increase of the input signal amplitude, thus calling for a short fall time. A typical input of speech impulse-speech pause signal, henceforth called speech envelope signal, must, on the other hand, see an essentially constant gain, thus calling for a long fall time. i.e., one which is long compared to the speech envelope period.

These conflicting demands, assuming a typical speech envelope period of 0.5 second, leads to a compromise value of 3 to 5 seconds for the Ordinary Fall time. This is six to ten times the typical speech envelope period and corresponds to the longer time constant R2C2 mentioned earlier. This is the time constant seen by the output of summing amplifier 48A with a normal speech envelope signal input since its output level will always be positive enough to back-bias and "open" diode D.

In case of any periodic characteristic, it may be said that the Ordinary Fall time should be sufficiently long compared to the period of the characteristic so that the gain is not influenced thereby, and a time constant of not less than about six times the period is acceptable.

The Sudden Fall Time is selected to limit an overshoot of the leveled output signal from upper threshold amplifier 40, in response to a sudden increase of the receiver output signal amplitude, while the amplifier gain is adjusting towards a new and lower value. The determining time constant is R1C1 with a typical value of 0.5 second or shorter for a speech envelope signal. How this time constant becomes engaged will be understood by the following consideration. The path from R1 to the output of summing amplifier 48A is normally blocked by back-biased diode D1 so that the "time response" of RC network 48B normally depends on R2C2. Upon the occurrence of a sudden increase in the amplitude of the receiver output signal, of materially greater amplitude than that of the preceding speech envelope signal, there would be a corresponding increase of the leveled output signal applied to summing amplifier 48A. This increased amplitude signal drives summing amplifier 48A to its saturation value which is made negative by several volts with respect to the cathode of diode D1. Diode D1 will then conduct and cause capacitor C1 to discharge rapidly through resistor R1 and diode D1 to the output of summing amplifier 48A. Since capacitor C1 is looking at the gain control input of amplifier 40, the gain and signal output of amplifier 40 decrease rapidly to nearly its normal level and maintain the output signal at its normal level until the longer time constant R2C2 again takes control at a new and lower gain level. The transition between the sudden input voltage rise and normal operation is facilitated by allowing resistor R3 to equalize charges between the two capacitors C1 and C2.

In accordance with these considerations, the Sudden Fall time constant should be as short as possible and no longer than approximately the periodic characteristic present in the intelligence. For example, for a speech envelope signal, a Sudden Rise time constant not longer than 0.5 second is entirely satisfactory.

The Ordinary Rise time is chosen to maintain the gain level established by a previous communication for a selected period of time, the length of which depends on the type of communication involved. Ordinarily, in case of speech envelope signls, the Ordinary Rise time should not be less than about 3 seconds or six times the speech envelope period. Perhaps an optimum time is about ten times the speech envelope period since this will avoid loss of the selected channel with a longer than normal speech pause. However, the Ordinary Rise time should be short compared to normal pause between different communications. In instances where it is desired to maintain the gain level established by a previous communication for a much longer time, an additional integrator can be provided, the output of which would ensure a much longer Ordinary Rise time if the application demands it.

The Ordinary Rise time is the result of adding two components, the first being the familiar R2C2 of network 48, the second is produced by utilizing the memory of the past history of the leveled signal obtained from integrator 42. As fully explained in my copending application, the speech envelope integrator output builds up in discrete steps to a final value determined by the speech amplitude above the noise level. The integrated signal decays, after removal of the input signal, to 37% of its maximum value in approximately 4 seconds. This signal, multiplied by a summing coefficient associated with summing amplifier 48A, converted to current, is integrated by the RC components of network 48B and serves to increase the Ordinary Rise time by being added to the existing rise time due to the R2C2 time constant.

Gain Stability, as defined earlier, should ideally be such as to allow the gain of upper threshold amplifier 40 to approach its final value, in response to a change of input signal amplitude, without over or undershoot (e.g., asymptotically). The basic stability governing this behavior is conventionally designed into upper threshold amplifier 40 and summing amplifier 48A. An additional stabilizing factor is due to the feedback signal provided by speech envelope integrator 42. This signal has the effect of increasing the delay time and thereby lowering the frequency of an eventual gain level "hunting" or oscillation. This, in turn, combined with an appropriate low frequency "cutoff" of the gain control input of the lower threshold amplifier, will provide the additional stabilizing effect.

Speech envelope demodulator 41 and speech envelope integrator 42 are similar to the ones described in my above-referenced copending application and serve the same general purpose. Briefly, demodulator 41 has applied to it the leveled output signal and provides, at its output, the demodulated signal which is commensurate with the amplitude modulation introduced by the selected characteristic which, in the case of speech, is the speech envelope. The demodulator has, as fully described in my above-referenced copending application, a rise time which is typically one-third of the length of the speech impulse so that the demodulator signal can rise to a maximum amplitude before the end of the speech impulse, and a decay time constant which is typically one-third of the length of the speech pause so that the demodulated signal can decrease to a minimum amplitude during the speech pause. These time constant values of one-third are equally applicable to other characteristics where the high amplitude condition corresponds to the impulse and the low amplitude condition corresponds to the pause. These time constants are sufficiently long to suppress the intelligence frequencies.

Integrator 42 integrates the demodulated signal to develop the channel quality signal. As fully explained in my copending application, the rise time constant of the integrator is typically one-third of the length of a speech impulse, and the decay time constant is long compared with the speech-impulse pause period, typically two to five times the period so that the quality signal increases in amplitude when the input is due to successive speech impulses. In this manner, the quality signal rises in amplitude with each speech impulse and falls with each speech pause. Since it falls less than it rises, the quality signal builds up over a period of time, and, since each rise is proportional to the audio signal over noise amplitude, the level of the quality signal becomes a measure of channel "quality." Since this quality signal is derived from the leveled output signal, different quality signals are compared on equal basis.

The quality signal is indicative of the quality of the received channel in that the greater its amplitude, the greater is the signal over noise amplitude of the receiver output signal. The system described in my above-referenced copending patent application likewise drives a signal commensurate with the quality of the channel, but differs in one very important respect. The receiver output signal of that system is applied to the demodulator-integrator combination directly and is not leveled. Accordingly, the amplitude of the integrated signal was also proportional to the signal amplitude of the receiver output signal. This could result in the selection of the channel with the largest audio amplitude signal. However, the channel with the largest amplitude audio signal is not necessarily the best channel since there is no assurance that that particular channel has also the largest signal to noise ratio. In the present invention, the quality signal from the integrator has an amplitude which is always commensurate with the signal over noise amplitude, and is independent of the absolute amplitude of the audio signal.

Figure 4:
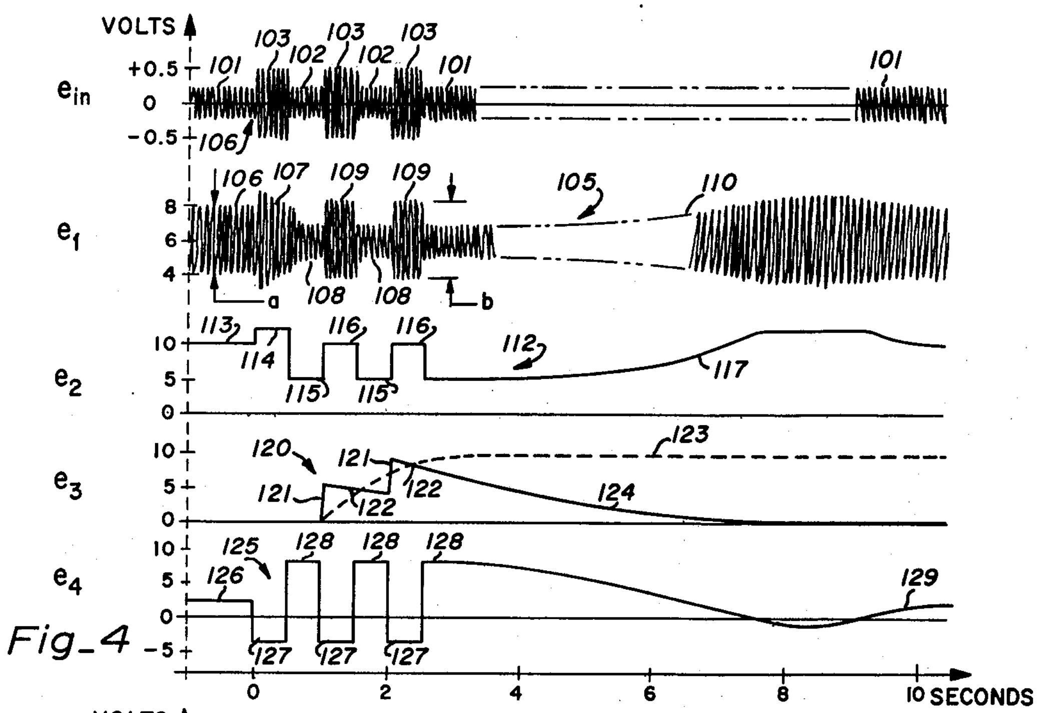
FIG. 4 are illustrative voltage versus time curves of typical waveforms encountered at various points in the automatic gain control upper threshold amplifier of the signal processing means of FIG. 3.

The operation of the upper threshold AGC amplifier channel will now be explained by reference to the curves shown in FIG. 4. Curve 100 illustrates the receiver output signal $e_{in}$ which is representative of a speech envelope signal including noise, which is present during the absence of speech as shown at 101 and during speech pauses as shown at 102, and voice plus noise present during the speech impulses 103.

Curve 105 illustrates the leveled signal output $e_1$ from upper threshold amplifier 40. Portion 106 shows normal output level in response to noise input. Portion 107 illustrates arrival of the first speech impulse with a momentary overshoot, and the resulting leveling action provided by the Sudden Fall time constant which is brought into effect by condition of diode D1. The following speech intervals 107 and speech impulses 108 see a reduced gain which is maintained for subsequent speech periods until the Ordinary Fall and Rise time constants take over control. Note that amplitude $b$ is slightly larger than amplitude $a$ due to the requirement for constant area under the curve in unit time. In the absence of any speech impulses, leveled signal $e_1$ once again builds up to the amplitude $a$ in accordance with the Ordinary Rise time constant as illustrated at 110.

Curve 112 illustrates the demodulated signal $e_2$ as modified by amplifier 49. Portion 113 shows the quiescent level of the amplifier output signal in the absence of a modulation, and portion 114 shows amplifier 49 being overloaded to its saturation point as the first speech impulse is received. At the end of the first speech impulse, the output signal drops with the drop in amplitude of the input signal, as shown by portions 115, and thereafter reproduces the speech envelope as shown by successive portions 115 and 116. As no more speech impulses are received, the demodulated signal follows the leveled signal in returning to its quiescent level as shown at 117.

Curve 120 illustrates the integrated signal $e_3$ which has, as already explained, a fast rise and a slow decay time. With each positive going pulse of the demodulated signal $e_2$, the integrated signal rises as shown at 121 and decays between positive going pulses as shown at 122. Dotted line 123 demonstrates the limiting value of the integrator signal which is generally obtained after several positive going transitions of the input signal. The two pulses shown in curve 120 are illustrative only of the fact that a limiting value is reached within a short time. In the absence of speech impulses, the integrator signal decays exponentially to zero as shown at 124.

Curve 125 illustrates the feedback signal $e_4$ applied to the RC time constant network 48B. Portion 126 represents the voltage required to maintain the gain of amplifier 40 such that the output signal has an amplitude $a$ as shown by curve 105. Upon arrival of the first speech impulse, which causes a large positive going output from demodulator 41, amplifier 48A is driven to its negative saturation level 127 and rapidly lowers the gain of amplifier 40 via conducting diode D1. The following speech pause drives the output of amplifier 48A to a positive level 128. The positive and negative levels 128 and 127 will gradually taper off and approach the equilibrium value 126 with subsequent speech periods. The mean value of curve 125 represents the voltage fed back to the gain control input at amplifier 40 via the feedback network.

(*b*) *Lower threshold AGC amplifier channel.*—The primary purpose for this channel in signal processing means 22A is to provide a means to evaluate the receiver output signals and exclude these signals unless they meet certain minimum criteria. Different criteria may be utilized including the signal over noise ampltude, the signal power, the noise power and the signal over noise ratio. FIG. 3 illustrates utilization of the signal over noise amplitude as a reference against which signal inputs are evaluated.

Amplifier 43 is a delayed action AGC amplifier having a constant gain up to a certain input level above which the amplification decreases rapidly. Demodulator 44 and integrator 45 may be alike in all respects to demodulator 41 and integrator 42 so that integrator 45 develops an integrated signal similar to the one developed by integrator 42. Accordingly, the integrator 45 provides an output signal proportional to the signal power of the receiver output signal.

Comparator 47 compares the output signal from integrator 45 with a reference voltage, and provides a constant amplitude channel suppression signal whenever the reference voltage exceeds the integrator output voltage. The channel suppression signal is applied to summing amplifier 48A and is of such amplitude that it decreases the gain of amplifier 40 to an "idle" and "standby" value which is less than the minimum required to develop a quality signal. In other words, the gain of amplifier 40 is decreased to such a small value that the leveled signal is too attenuated to be annoying to an operator or to interfere at the utilization device or to develop a quality signal.

In operation, if the receiver output signal has a signal over noise amplitude which is below a preselected level, as determined from the output signal from integrator 45, and if the reference voltage from generator 46 is set above this selected level, comparator 47 will provide a channel suppression signal which, when applied to the feedback loop of amplifier 40, will reduce the amplifier gain to an "idle" gain. However, at any time that the signal over noise amplitude increases to a value above the preselected level, the output signal from integrator 45 will increase to a level above that of the reference voltage which removes the channel suppression signal from the feedback loop of amplifier 40 causing the same to increase its gain for proper leveling.

If the desired criteria for evaluation is the signal power, then integrator 45 is combined with an averaging network and is coupled to demodulator 44 through a series capacitor and a shunt diode. If the desired criteria for evaluation is the signal plus noise power, then integrator 45 is replaced with an averaging network. If the desired criteria for evaluation is noise power, then both the integrator with averaging network and a further averaging network are placed in parallel and the outputs therefrom are subtracted by a difference amplifier so that a signal commensurate with noise power alone is obtained. In other words, the signal power of the integrator is substracted from the signal plus noise power of the averaging network.

If the desired criteria for evaluation is the signal over noise ratio in db, the noise power signal and the signal power signal, developed as explained above, are passed through logarithmic amplifiers and substracted. The difference signal so obtained is the signal applied to comparator 47.

Quality signal selection means

The channel quality signal developed by processing means 22A is applied, via lead 50A, to a comparator 51A which compares its amplitude with that of a reference voltage $E_R$ on lead 52. Similarly, the channel quality signal developed by processing means 22B is applied, via lead 50B, to a comparator 51B for comparing the amplitude of this channel quality signal with the same reference voltage $E_R$. Selection of the best channel is made on the basis of the channel whose quality signal first exceeds the reference voltage $E_R$ and utilizing the output of the comparator of the selected channel to preselect that particular channel.

In my above-reference copending application, reference voltage $E_R$ is fixed which implies that only a channel signal having a signal over noise amplitude above a selected minimum value will cause selection. While this arrangement is entirely satisfactory, it nevertheless limits selection to a fixed range of signal over noise amplitudes.

To adapt the system to a more extended range of signal over noise amplitudes (or any other of the possible criteria which may be evaluated), reference voltage $E_R$ may be made dependent on the largest amplitude quality signal to assure selection of the best of a number of poor channels, providing, of course, that the receiver output signal exceeds the lower threshold of acceptability. In this manner, the system assures the selection of the best quality signal channel under all conditions of acceptable receiver output signals.

Figure 5:
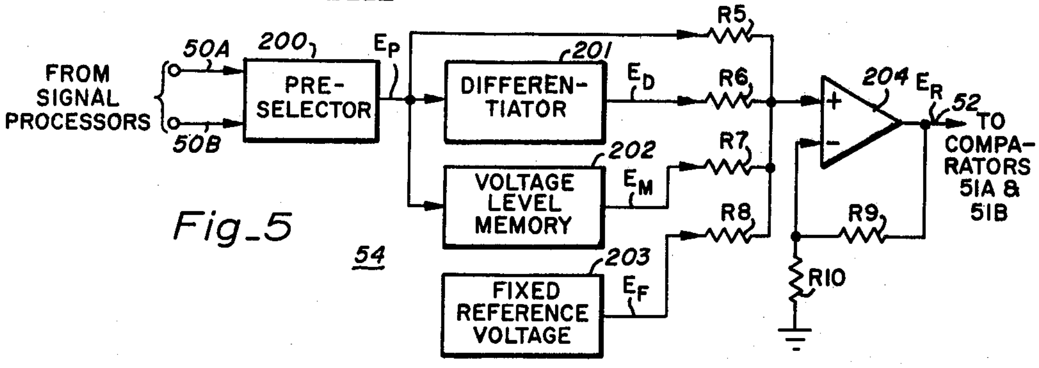
FIG. 5 is a schematic block diagram of the receiver output signal processing means of FIG. 2, the feedback network being shown partly in schematic circuit form.

To obtain such a self-adaptive selection reference voltage $E_R$, there is provided a self-adaptive selection reference generating means 54. As best seen in FIG. 5, generating means 54 includes a preselection means in the form of a comparator 200 which has its input terminals connected to processor output leads 50A and 50B and which is constructed to pass only the highest amplitude quality signal applied thereto. Comparator 200 is constructed by connecting the cathodes of a number of diodes to a common load resistor and by connecting each anode to individual channel signal outputs. The highest signal will forward bias its diode, thereby raising the voltage across the common load and back-biasing the other diodes. The effect is that the comparator provides its own reference equal to the highest of a number of input levels.

The output signal $E_p$ from comparator 200 is the quality signal having the highest amplitude and will be referred to as the preselection signal.

The preselection signal is also applied to a differenciator 201 which provides a differentiated preselection signal $E_D$ and to a voltage level memory circuit 202 which provides a signal $E_M$. There is further provided a fixed reference voltage generator 203 having an output voltage $E_F$. The various signals $E_p$, $E_D$, $E_M$ and $E_F$ are applied, through summing resistors R5, R6, R7 and R8, to a summing amplifier 204 whose output signal is the self-adaptive reference signal $E_R$.

Mathematically, the reference signal $E_R$ is given by the following expression:

$$E_R = K_1E_P + K_2E_D + K_3E_M + K_4E_F$$

where $$K_1 = \frac{R9}{R5},\ K_2 = \frac{R9}{R6},\ K_3 = \frac{R9}{R7},\ K_4 = \frac{R9}{R8}$$

$$E_D = K_5 \frac{dE_p}{dt}$$

and $K_5$ is proportional to the time constant of the differentiating circuit.

Figure 6A:
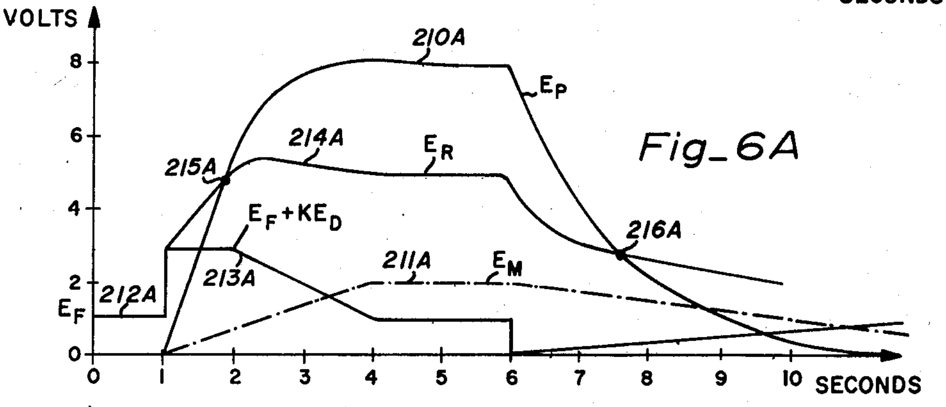
FIGS. 6A and 6B are illustrative voltage versus time curves useful in connection with explaining the operation of the reference voltage circuit of FIG. 5.
Figure 6B:
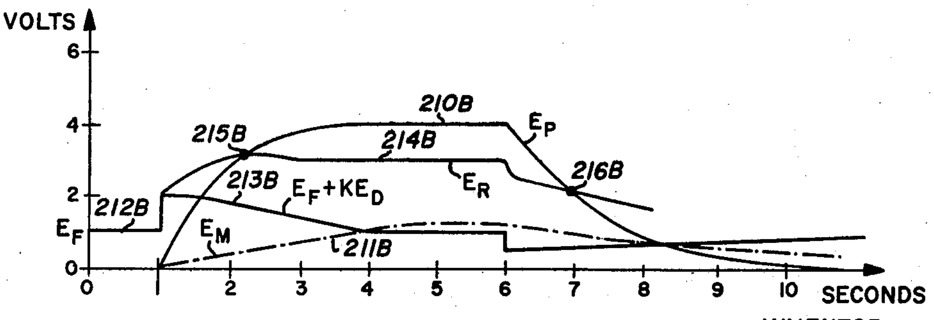

For a better understanding of circuit 54, reference is made to the voltage versus time curves shown in FIG. 6A which illustrate the development of a reference signal $E_R$ in the presence of a very good channel and of FIG. 6B which illustrate the development of a reference signal $E_B$ in the presence of only a poor, but still acceptable, channel.

The various curves shown in FIGS. 6A and 6B will be discussed together, and are identified so that corresponding curves are labled with the same reference number to which the distinguishing reference characters A and B are added. The various constants K were assigned the following values in constructing FIGS. 6A and 6B: $K_1=0.25$, $K_2K_5=1.40$, $K_3=2.00$, and $K_4=1.00$. Further, fixed reference voltage $E_F$ was assigned the value of 1 volt.

Curves 210 represent the preselected signal $E_p$ which was selected at the end of the 1st second and rises steeply until the end of the 2nd second. Between the end of the 2nd second and the end of the 4th second, $E_p$ increases slowly in amplitude, and between the end of the 4th second and the end of the 6th second $E_p$ is substantially level. At the end of the 6th second, $E_p$ starts to decrease in amplitude reaching zero amplitude approximately at the end of the 11th second. Curve 210A of FIG. 6A illustrates the case of a very good channel where the preselection signal $E_p$ rises to a value of 8 volts, and curve 210B of FIG. 6B illustrates the case of a rather poor, but still acceptable, channel in which the preselection signal $E_p$ rises only to 4 volts.

The portions of curves identified as 212A and 212B represent the fixed reference voltage $E_F$ of 1 volt, and curves 213A and 213B represent the sum of the fixed reference voltage $E_F$ and of the differentiated voltage $E_D$, as seen at the output of amplifier 204. At the end of the 1st second, curves 213A and 213B increase sharply upwards because of the differentiated voltage components and then level off. At the end of the 4th second, when the preselected voltage $E_p$ becomes level, curves 213A and 213B have returned to the level of the fixed reference voltage $E_F$. At the end of the 6th second, when there is a sharp decrease in the amplitude of the preselection signal $E_p$, curves 213A and 213B decrease downwardly to zero after which they slowly recover to return to the fixed reference voltage $E_F$.

Curves 211A and 211B represent the voltage level memory signal $E_M$ which increases after the occurrence of the preselection signal $E_p$, and which becomes level until the end of the 6th second. Thereafter, the memory signal slowly decreases to zero. Curves 214A and 214B represent the reference signal $E_R$, which comprise the preselection signal $E_p$, the fixed reference voltage $E_F$, the memory signal $E_M$ and the differentiated signal $E_D$, the values of the various constants K being taken into account.

Since reference voltage $E_R$ is compared with the quality signal in comparators such as 51A and 51B, it is immediately evident that the points of intersections of curves 210 and 214 determine the amplitudes of the preselection signal at which a "selection decision" and a "clear decision" is made. The point 215 at which curve 210 first exceeds curve 214 is the point at which the comparator will provide an output signal, the selection signal, indicating that a "selection decision" has taken place. The point 216 at which the preselection signal first becomes less than the reference signal is a point at which the comparator no further provides an output indicating that a "clear decision" has been made.

Since the reference signal $E_R$ adapts itself to the amplitude of the preselection signal $E_p$, it is immediately evident that the system is self-adaptive to good and poor channels alike. For example, FIG. 6A illustrates a selection decision when the preselection signal $E_p$ reaches approximately 5 volts while FIG. 6B illustrates a selection decision when the preselected signal $E_p$ is only 3 volts. Similarly, the clear decision point, at which a channel is deemed to be unsuitable for selection and where it is more desirable to forego any selection, likewise adapts itself to the channel and its past history. For example, FIG. 6A illustrates a clear decision when the preselected signal $E_p$ drops to below approximately 3 volts and FIG. 6B illustrates a clear decision when the preselected signal $E_p$ drops below approximately 2 volts. In this manner, the best channel may be selected in accordance with certain preselected criteria which are not absolute in the sense that a channel below a certain quality will never be selected. Instead, by a careful selection of the various constants $K_1$ to $K_5$, channel selection of the best available channel can be had over a wide range of values, and channel selection may be maintained in accordance with selected criteria until it is clearly no longer desirable to maintain a channel selected.

Channel selector

The output lead of comparators 51A and 51B, one of which carries the selection signal, are connected to a channel selection means in the form of a logic network. More specifically, the output lead of comparator 51A is connected to the enabling terminal of a set gate SA and, through an inverter 55A, to the enabling terminal of a clear gate CA. The output terminal of set gate SA is connected to the set terminal S of a bistable multivibrator 56A, and the output terminal of clear gate CA is connected to its clear terminal C. Similarly, the output terminal of comparator 51B is connected to the enabling terminal of set gate SB which, in turn, is connected to the set terminal S of a multivibrator 56B, and, through a suitable inverter 55B to the enabling terminal of clear gate CB which, in turn, is connected to the clear terminal C of multivibrator 56B.

The high output terminals of bistable devices 56A and 56B are connected, through a conventional OR gate 58, to the enabling terminals of an attenuator or switch control AND gate MA which controls attenuator 26A, and to an attenuator control AND gate MB which controls attenuator 26B. Further, the low output terminal of bistable device 56A is connected to the gate terminal of attenuator control gate MA, and the low output terminal of bistable device 56B is connected to the gate terminal of attenuator control gate MB. Finally, there is provided a selection interval generator 60 which provides a reselect trigger pulse which is applied to set gates SA and SB and clear gates CA and CB. The frequency of the reselect trigger pulses is selected in accordance with the normally anticipated time interval during which a channel remains a good channel. For vehicular communication systems, a frequency of about 10 Hz. is suitable.

In operation, assume that bistable devices 56A and 56B are initially clear. Since gates MA and MB, under such circumstances, receive a true signal from the low output terminal of the bistable devices and a false signal from the high output terminal, they provide a false output signal which maintains attenuators 26A and 26B at minimum attenuation (maximum transmission). Under these circumstances, all leveled output signals are applied, through mixer 27 and amplifier 28, to utilization device 30. This state of conditions is maintained until either comparator 51A or comparator 51B provide a selection signal coincident with a reselection pulse from generator 60.

Assume next that comparator 51B provides a true signal indicating the presence of a selection signal. This true signal enables set gate SB and disables clear gate CB. Therefore, upon occurrence of the next reselection pulse from generator 60, gate SB has two true input signals and therefore provides a true output signal to set multivibrator 56B. Setting this multivibrator causes a true signal from its high output terminal to pass through OR gate 58 which partly enables both attenuator control gates MA and MB. However, since the low output terminal of multivibrator 56B is now false, the output of gate MB is false and attenuator 26B remains as before. However, gate MA now receives two true signals causing it to pass a true signal which switches attenuator 26A to its maximum attenuation position, thereby attenuating the leveled output signals from processor 22A. As long as channel B remains selected, this mode of operation will be maintained. If the quality signal from the selected channel reaches the "clear decision" point, the clear gate SB will be preselected and the bistable MV returns to clear state coincident with the first reselection pulse from generator 60. All channels are then applied to utilization means 32.

To transmit over the channel selected during the immediately preceding reception, selection interval generator 60 is provided with a clamping feature to disable the same during the transmission. This is implemented by a reference generator 70 in utilization device 30 whose output is connected, through a suitable switch 71, to the clamping voltage input terminal of generator 60 via lead 72. Accordingly, upon depressing key 71, selection interval generator 60 is disabled causing the immediately preceding selected channel to remain selected. The clamping voltage on lead 72 may also form the enabling signal for transmitter 16 to which it is connected via lead 73.

Assuming operation between transmitter 16 and relay 14A on a frequency $f_1$, and between transmitter 16 and relay 14B on a frequency $f_2$, selection of a suitable frequency is made by providing transmitter code generators 74A and 74B which have their respective output terminals connected, through an OR gate 75, to the code input terminal of transmitter 16 via lead 76. In response to a transmitter code from generator 74A, transmitter 16 will transmit on a carrier frequency $f_1$ and in response to a code from generator 74B, transmitter 16 will transmit on a carrier frequency $f_2$.

Selection of the proper transmitter code generator is provided by transmitter AND gates TA and TB. The enabling signal for transmitter gate TA is provided by a true signal from the high output terminal of multivibrator 56A, and the enabling signal for transmitter gate TB is provided by a true signal from the high terminal of multivibrator 56B. The true signal for both transmitter AND gates TA and TB is provided by the reference voltage 70 applied via transmit key 71.

In operation, assuming that multivibrator 56B is set, indicating that the receiver 12B channel was selected, the true signal from multivibrator 56B enables transmitter AND gate TB so that closure of transmit key 71 provides a true signal to select code generator 74B.

To further increase the assurance against the simultaneous selection of more than one channel, a scanning device may be added as shown in dotted outline in FIG. 2. This scanning device comprises a ring counter 80 which applies one true signal at a time to set gates SA and SB (these gates being selected as triple input gates) so that only one is enabled while all others are disabled. Ring counter 80 is driven by clock pulses from generator 60 to which it is connected through an AND gate 81. Gate 81 has its enabling input terminal connected to the output of OR gate 58 through an inverter 82.

In operation, and prior to a channel selection, the output from OR gate 58 is false so that inverter 82 applies a true signal to AND gate 81, and consecutive clock pulses advance ring counter 80 to consecutively apply a true signal to one of the SA and SB gates at a time. As soon as a selection is made, the output signal from OR gate becomes true and therefore the output signal from inverter 82 becomes false, thereby closing AND gate 81.

The invention of the channel selection network was described with particular reference to a voice communication system in which channel selection depends on the inherently present modulation of the audio signal, i.e., the alternate speech impulses and speech pauses forming the speech envelope. It is to be understood, however, that the same principle is applicable to other communication systems, including those for the transmission of data and the like. When practiced in connection with non-voice communication systems, it will be necessary that the transmitted intelligence of frequency $f$ (which may be an extended range) be modulated alternately on and off so that demodulator 41 and integrator 42 can produce an output signal commensurate with the signal to noise ratio, or signal over noise amplitude, of the received intelligence. Referring to this added modulation as a duty cycle, which has an "on" time $T_1$ and an "off" time $T_2$ and a period $T=T_1+T_2$, the following must be observed in practicing the above-described invention.

The times $T_1$ and $T_2$ must be at least an order of magnitude above the largest time $1/f$. The rise time constant of the demodulator should be small compared to $T_1$ and large compared to $1/f$, and $\frac{1}{3}$ $T_1$ is regarded as a good compromise. The fall time constant of the demodulator should be small compared with $T_2$ and large compared with $1/f$, and $\frac{1}{3}$ $T_2$ is regarded as a satisfactory compromise. The rise time constant of the integrator should be small compared to $T_1$ and large compared to $1/f$, and $\frac{1}{3}$ $T_1$ is regarded as a satisfactory compromise. The fall time constant of the integrator should be large compared with T but small to detect the end of a transmission, and two to five times T is regarded as satisfactory. For the automatic gain control, the Ordinary Fall time should ideally be short but must be long compared to T, and six to eight times T is a satisfactory compromise. The Ordinary Rise time should be long compared to $T_2$ and thirty to forty times $T_2$ is satisfactory. The Sudden Fall time constant should be short, and $\frac{1}{2}$ T or smaller is regarded as satisfactory. The above time constant values are given by way of example only, and it must be understood that they may be selected within a broad range as long as they satisfy the operating conditions.

There has been described herein a channel selection system for a multiple channel communication system which selects the channel having the best signal over noise amplitude, or signal to noise ratio, providing that the receiver output signals satisfy certain minimum quality criteria. In the event that the receiver output signal does not meet the selected minimum quality criteria, it is suppressed to prevent it being applied to the utilization device and to prevent it from entering into the selection process.

While the above detailed description has shown and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. A multichannel intelligence communication system including an automatic channel selection system comprising, in combination:

signal transmitter means for providing a transmit signal which includes the intelligence to be transmitted and a periodically varying characteristic associated only with the intelligence which has a frequency which is at least an order of magnitude lower than the lowest frequency of the intelligence to be transmitted, said periodic characteristic providing a maximum amplitude condition of the intelligence of duration $T_1$ and a minimum amplitude condition of the intelligence of duration $T_2$;

a plurality of channel receiver means;

a different transmission path coupling each of said channel receiver means to said transmitter means, each channel receiver means being responsive to said transmit signal and operative to derive a channel receiver output signal consisting of said intelligence and said periodically varying characteristic;

a channel signal processing means coupled to each said channel receiver means, said processing means being responsive to the amplitudes of said receiver output signals and operative to provide leveled signals of a common amplitude and quality signals indicative of the noise present in the channel receiver output signals;

common utilization means including means for applying each of said leveled signals to said utilization means, said last mentioned means including channel attenuator means for controlling the amplitude of said leveled signals, each of said attenuator means having a first state providing minimum attenuation and a second state providing maximum attenuation, said attenuator means being normally in said first state and being switchable to said second state upon the occurrence of a switching signal;

selector means responsive to each of said quality signals and operative to provide a selection signal which identifies the channel receiver means providing the highest quality intelligence based on the noise present; and switching signal generating means responsive to said selection signal and operative to provide switching signals for switching all attenuator means, except the attenuator means connecting the leveled signal from the channel receiver means providing the highest quality intelligence to said utilization means, from said first to said second state.

2. An intelligence communication system in accordance with claim 1 in which said channel signal processing means includes an automatic gain control amplifier means which levels said receiver output signal in accordance with a selected characteristic of said periodically varying characteristic.

3. An intelligence communication system in accordance with claim 1 in which said channel signal processing means includes an automatic gain control amplifier means comprising a variable gain amplifier and a feedback circuit including a serially connected demodulator means and an RC time constant network, said demodulator means deriving a demodulated signal commensurate with the envelope of said periodically varying characteristic.

4. An intelligence communication system in accordance with claim 3 in which said demodulator means has a rise time which is shorter than $T_1$ but long compared to the frequency of said intelligence, and a fall time which is shorter than $T_2$ but long compared to the frequency of said intelligence.

5. An intelligence communication system in accordance with claim 3 in which said RC time constant network has an Ordinary Fall time to decrease the gain of said amplifier for ordinary amplitude increases of said channel receiver output signal, a Sudden Fall time to decrease the gain of said amplifier for sudden amplitude increases of said channel receiver output signal, and an Ordinary Rise time to increase the gain of said amplifier for ordinary amplitude decreases of said channel receiver output signal.

6. An intelligence communication system in accordance with claim 5 in which the Ordinary Fall time of said RC time constant network is selected longer than the period of said periodic characteristic so that the leveled signal is essentially independent of said periodic characteristic.

7. An intelligence communication system in accordance with claim 6 in which the Ordinary Fall time of said RC time constant network is selected shorter than the time period between normally anticipated ordinary amplitude increases of said receiver output signal.

8. An intelligence communication system in accordance with claim 7 in which the Ordinary Fall time of said RC network is approximately six to ten times the period of said periodically varying characteristic.

9. An intelligence communication system in accordance with claim 5 in which the Sudden Fall time of said RC time constant network is selected to be not longer than the period of said periodic characteristic.

10. An intelligence communication system in accordance with claim 5 in which the Ordinary Rise time of said RC time constant network is selected longer than the period of said periodic characteristic so that the leveled signal is essentially independent of said periodic characteristic.

11. An intelligence communication system in accordance with claim 10 in which the Ordinary Rise time of said RC time constant network is selected shorter than the normally anticipated time period between successive and different communications.

12. An intelligence communication system in accordance with claim 11 in which the Ordinary Rise time of said RC network is approximately ten times the period of said periodically varying characteristic.

13. An intelligence communication system in accordance with claim 5 for the transmission of speech in which the Ordinary Fall time is selected from between about 3 to 5 seconds, the Ordinary Rise time is selected not shorter than about 3 seconds and the Sudden Fall time is selected not longer than about 0.5 second.

14. An intelligence communication system in accordance with claim 2 which further includes threshold means responsive to the amplitude of said channel receiver output signal and operative to decrease the gain of said automatic gain control amplifier to a standby gain whenever the amplitude of said channel receiver output signal is below a selected minimum level, whereby the amplitude level of said leveled signal is reduced to a value which is substantially below said common amplitude.

15. An intelligence communication system in accordance with claim 4 in which the Ordinary Fall time of said RC time constant network is selected sufficiently long to maintain the gain of said variable gain amplifier substantially independent of said periodic characteristic and sufficiently long to reduce the gain of said amplifier in response to normally anticipated ordinary increases of the amplitude of said channel receiver output signal to maintain the leveled signal at a constant amplitude, and in which the Ordinary Rise time of said RC time constant network is selected sufficiently long to maintain the gain of said amplifier substantially independent of said periodic characteristic and sufficiently short to increase the gain of said amplifier to a value indicating the absence of intelligence in a time which is less than the normally anticipated pause between the end of one communication and the beginning of a subsequent communication.

16. An intelligence communication system in accordance with claim 15 in which the Sudden Fall time of said RC time constant network is selected sufficiently short to reduce the gain of said variable gain amplifier in response to a sudden increase of the amplitude of said channel receiver output signal in a time which is not longer than $T_1+T_2$.

17. An intelligence communication system in accordance with claim 3 in which said automatic gain control means further includes an integrator which is responsive to said demodulated signal and which provides said quality signal, said quality signal being applied to said RC time constant network to control the gain of said variable gain amplifier to provide stability.

18. An intelligence communication system in accordance with claim 1 in which said signal processing means comprises a variable gain amplifier responsive to a gain control signal and operative to provide said leveled signal, a further amplifier to provide an unleveled signal, said channel receiver output signal being applied to said variable gain amplifier and said further amplifier, demodulator means responsive to said leveled signal and operative to provide a demodulated signal, integrator means responsive to said demodulated signal and operative to provide said quality signal, further demodulator means responsive to said unleveled signal and operative to provide a further demodulator signal, further integrator means responsive to said further demodulator signal and operative to provide an integrated signal, means responsive to said integrated signal and operative to provide a suppression signal when the amplitude of said integrated signal is below a preselected level, and gain control signal generator means responsive to said demodulated signal, said integrated signal and said suppression signal and operative to develop said gain control signal.

19. An intelligence communication system in accordance with claim 18 in which said gain control signal maintains said variable gain amplifier at a low idle gain in the presence of said suppression signal.

20. An intelligence communication system in accordance with claim 1 in which said selector means comprises a generating means for providing a selection reference signal and a plurality of selection comparator means for comparing the quality signals from each channel with said selection reference signal, said selection comparator means being constructed to provide selection signals in response to and as long as the amplitude of the applied quality signal exceeds the amplitude of said selection reference signal.

21. An intelligence communication system in accordance with claim 20 in which the amplitude of said selection reference signal is a function of the amplitude of the highest amplitude quality signal.

22. An intelligence communication system in accordance with claim 21 in which the amplitude of said selection reference signal is further a function of the immediate past history of the highest amplitude quality signal.

23. An intelligence communication system in accordance with claim 20 in which said generating means for providing said selection reference signal comprises a preselection means which compares the quality signals from each of said signal processing means and which selects the one having the highest amplitude as a preselection signal, a differentiating means for differentiating said preselected signal and for providing a differentiated preselected signal, and summing means for combining said preselected signal and said differentiated signal to derive said selection reference signal.

24. An intelligence communication system in accordance with claim 23 in which said generatiang means further includes a fixed reference voltage source whose output is combined by said summing means with a preselected signal and said differentiated preselected signal to derive said selection reference signal.

25. An intelligence communication system in accordance with claim 24 in which said generating means further includes a voltage level memory means which is responsive to said preselected signal and which provides a n.emory signal indicative of the immediate past history of said preselection signal, said memory signal being combined by said summing means with said preselected signal, said differentiated signal and the output from said voltage source to derive said selection reference signal.

26. A communication intelligence system in accordance with claim 1 in which said selector means comprises: a generating means which is responsive to each of said quality signals and operative to select the one having the largest amplitude as the preselection signal; means responsive to said preselection signal and operative to derive a processed signal which is indicative of the amplitude variation of said preselection signal with time; summing means for combining said preselection signal and said processed signal to provide said selection reference signal; and a plurality of selection comparator means for comparing each of said quality signals with said selection reference signal and for providing said selection signal when the amplitude of the compared quality signal exceeds the amplitude of said selection reference signal.

27. An intelligence communication system in accordance with claim 26 in which said switching signal generating means is responsive to each of said selection signals and operative to switch the channel attenuator means of the channels providing quality signals having an amplitude which is less than the amplitude of said selection reference signal to said second state.

28. An intelligence communication system in accordance with claim 27 in which said switching signal generating means includes means for sequentially interrogating said plurality of selection comparator means and for selecting only the first encountered comparator means providing a selection signal for further processing, whereby only a single leveled signal is applied to said utilization means.

References Cited

UNITED STATES PATENTS

| | | | |
|---|---|---|---|
| 3,230,458 | 1/1966 | Stangleland | 325—410 |
| 3,331,030 | 7/1967 | Jordan et al. | 325—411 |
| 3,403,341 | 9/1968 | Munch | 325—65 |

RICHARD MURRAY, Primary Examiner

A. J. MAYER, Assistant Examiner

U.S. Cl. X.R.

325—56, 304, 480